United States Patent
Kuo

(10) Patent No.: US 6,975,916 B2
(45) Date of Patent: Dec. 13, 2005

(54) METHOD AND SYSTEM FOR DETERMINING THE BEST INTEGRAL PROCESS PATH TO PROCESS SEMICONDUCTOR PRODUCTS TO IMPROVE YIELD

(75) Inventor: Neal Kuo, Chia-yi (TW)

(73) Assignee: ProMos Technologies, Inc., Hsinchu (TW)

( * ) Notice: Subject to any disclaimer, the term of this patent is extended or adjusted under 35 U.S.C. 154(b) by 565 days.

(21) Appl. No.: 09/900,165

(22) Filed: Jul. 9, 2001

(65) Prior Publication Data

US 2002/0138818 A1 Sep. 26, 2002

(30) Foreign Application Priority Data

Sep. 14, 2000 (CN) .......................................... 89118788 A

(51) Int. Cl.[7] .............................................. G06F 19/00
(52) U.S. Cl. ........................ 700/121; 700/29; 382/149
(58) Field of Search ..................... 700/121, 29; 382/149

(56) References Cited

U.S. PATENT DOCUMENTS 5,450,326 A * 9/1995 Black .......................... 700/121
5,691,895 A * 11/1997 Kurtzberg et al. ............. 700/29
6,292,582 B1 * 9/2001 Lin et al. ..................... 382/149
6,477,685 B1 * 11/2002 Lovelace ......................... 716/4
6,714,832 B1 * 3/2004 Nishihata et al. ............ 700/121

* cited by examiner

*Primary Examiner*—Kidest Bahta
(74) *Attorney, Agent, or Firm*—Finnegan, Henderson, Farabow, Garrett & Dunner, L.L.P.

(57) ABSTRACT

A computer-implemented method for identifying the best process path in a semiconductor manufacturing process for processing a plurality of wafer lots that includes providing a plurality of operations in the semiconductor manufacturing process, providing a plurality of tools in at least one of the plurality of operations, providing a plurality of yields for each of the plurality of operations, providing a plurality of process paths, calculating an average yield for the plurality of yields, setting the average yield as a response, setting the plurality of operations as control factors, setting the plurality of tools as factor levels in response to at least one of the plurality of operations, determining at least one of the plurality of operations as having the most contribution using an analysis of variance method, wherein the at least one of the plurality of operations causes the responses to change greater than a predetermined level when the plurality of tools are changed, and outputting the at least one of the plurality of operations as the most influential operation.

14 Claims, 3 Drawing Sheets

| LOT: $L_a$ | | PROCESS FLOW = PF101 | | | | — $D_a$ |

| OPERATION | Op1 | Op2 | Op3 | Op4 | ------ |
|---|---|---|---|---|---|
| TOOL | $T_{1,4}$ | $T_{2,2}$ | $T_{3,1}$ | $T_{4,2}$ | ------ |

$Ld_a$

| WAFER | $W_{a,1}$ | $W_{a,2}$ | $W_{a,3}$ | $W_{a,4}$ | ------ |
|---|---|---|---|---|---|
| YIELD | $Y_{a,1}$ | $Y_{a,2}$ | $Y_{a,3}$ | $Y_{a,4}$ | ------ |

$Yd_a$

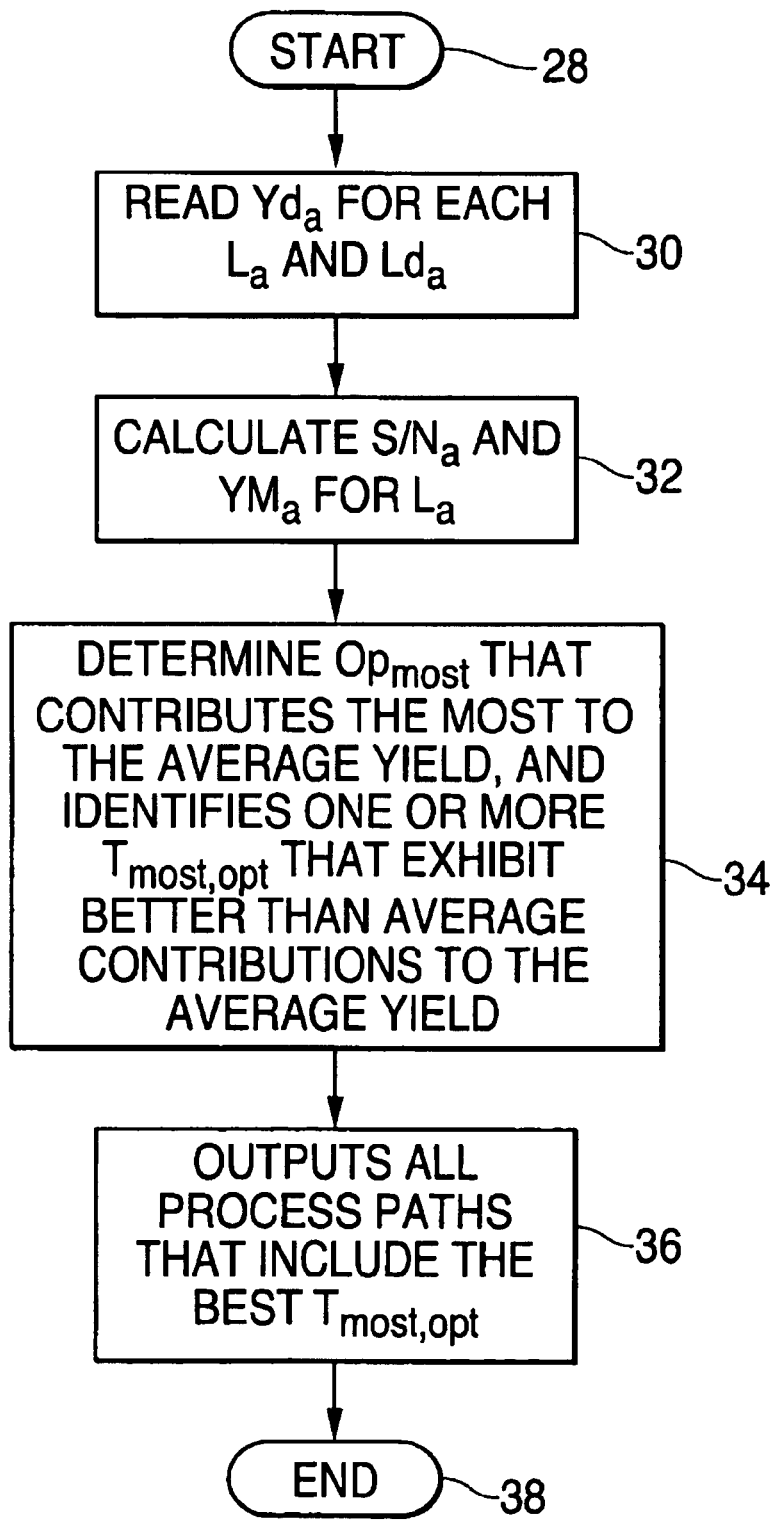

METHOD AND SYSTEM FOR DETERMINING THE BEST INTEGRAL PROCESS PATH TO PROCESS SEMICONDUCTOR PRODUCTS TO IMPROVE YIELD

BACKGROUND OF THE INVENTION

1. Field of the Invention

This invention pertains in general to the manufacture of semiconductive products, and more particularly, to a method and system for determining the best integral process path to process semiconductor products.

2. Description of the Related Art

In a semiconductor manufacturing process, semiconductor wafers are patterned and processed to produce integrated circuits (ICs). To produce an IC, a specific manufacturing process is provided to define a sequence of operations in the manufacturing process based on the requirement of the IC. Taking a manufacturing process of 16-Mbit dynamic memory IC as an example, the operations comprise at least a photolithography operation, an ion-implanting operation, and a resist-removed operation. There is at least one tool in each operation and the tool is chosen randomly to carry out the manufacturing process, and the number of acceptable ICs produced in the manufacturing process is termed "yield."

Controlling a manufacturing yield is an important issue in the production of semiconductor products, which can be wafers or chips and the respective yield is termed "wafer yield" and "chip yield." Generally, a manufacturing yield indicates the efficiency and cost of production lines in a semiconductor fab. When the yield is increased and the stability of the yield is controlled, the fab generally is able to maintain a steady production.

To improve the yield of semiconductor products, an integration engineer is generally asked to optimize all of the tools of a particular operation to that of the best performing tool. The integration engineer generally relies only on his/her experience in the optimization process. However, this process addresses a single operation at a time and ignores the relationship between operations and between tools within the same operation. Therefore, this method does not consider an overall process integration. During a manufacturing process, semiconductor wafers are processed through a process path that includes a sequence of operations using various manufacturing tools. Because there are numerous possible integral path combinations, it is impossible to determine the best path by means of the above-mentioned conventional method.

SUMMARY OF THE INVENTION

Accordingly, the present invention is directed to a method and system for determining the best process path in a manufacturing process that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structures and methods particularly pointed out in the written description and claims thereof, as well as the appended drawings.

To achieve these and other advantages, and in accordance with the purpose of the invention as embodied and broadly described, there is provided a computer-implemented method for identifying the best process path in a semiconductor manufacturing process for processing a plurality of wafer lots that includes providing a plurality of operations in the semiconductor manufacturing process, providing a plurality of tools in at least one of the plurality of operations, providing a plurality of process paths, providing a plurality of lot yields corresponding to the plurality of wafer lots, setting the plurality of lot yields as responses, setting the plurality of operations as control factors, setting the plurality of tools as factor levels in response to at least one of the plurality of operations, determining at least one of the plurality of operations by using an analysis of variance method with the responses, control factors, and factor levels, determining a best tool for the one of the plurality of operations having the most influence by retrieving a maximum statistical characteristic, and outputting at least one best process path from the plurality of process paths, wherein the at least one best process path includes the best tool.

In one aspect of the invention, the statistical characteristic comprises a signal to noise ratio.

In another aspect of the invention, the statistical characteristic comprises an average yield.

In yet another aspect of the invention, the method further includes determining at least one of the plurality of tools corresponding to the at least one of the plurality of operations as having the most contribution to the average yield.

In still another aspect of the invention, the step of determining at least one of the plurality of operations by using an analysis of variance method that includes comparing each of the plurality of operations relative to the average yield, ignoring the plurality of operations having only a single tool, and considering the plurality of operations having a greater than a predetermined level of contribution over the average yield.

Also in accordance with the present invention, there is provided a computer-readable medium storing instructions executable by a processor for identifying the best process path in a semiconductor manufacturing process for processing a plurality of wafer lots that includes providing a plurality of operations in the semiconductor manufacturing process, providing a plurality of tools in at least one of the plurality of operations, providing a plurality of process paths, providing a plurality of lot yields corresponding to the plurality of wafer lots, setting the plurality of lot yields as responses, setting the plurality of operations as control factors, setting the plurality of tools as factor levels in response to at least one of the plurality of operations, determining at least one of the plurality of operations by using an analysis of variance method with the responses, control factors, and factor levels, determining a best tool for the one of the plurality of operations having the most influence by retrieving a maximum statistical characteristic, and outputting at least one best process path from the plurality of process paths, wherein the at least one best process path includes the best tool.

Further in accordance with the present invention, there is provided a computer-implemented method for identifying the best process path in a semiconductor manufacturing process that includes providing a plurality of operations in the semiconductor manufacturing process, providing a plurality of tools in at least one of the plurality of operations, providing a plurality of process paths, providing a plurality of lot yields corresponding to the plurality of wafer lots, setting the plurality of lot yields as responses, setting the plurality of operations as control factors, setting the plurality of tools as factor levels in response to at least one of the plurality of operations, determining at least one of the plurality of operations by using an analysis of variance method with the responses, control factors, and factor levels, to determining a best tool for the one of the plurality of operations having the most influence by retrieving a maximum statistical characteristic, and outputting at least one best process path from the plurality of process paths, wherein the at least one best process path includes the best tool.

Additionally in accordance with the present invention, there is provided a system for determining best process paths in a semiconductor manufacturing process including a yield database for storing a plurality of yield data corresponding to a plurality of wafer lots manufactured by the specific manufacturing process, wherein each of the plurality of wafer lots includes a plurality of wafers, and wherein the plurality of yield data corresponds to the plurality of the plurality of wafer lots, a process history database for storing a plurality of process path data, a memory for storing a program, and a microprocessor for performing the program, the microprocessor reading the plurality of yield data and process path data, using an analysis of variance method for identifying the most influential operation from the plurality of operations.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawing:

FIG. 5 is a flow chart of the method of the present invention.

DETAILED DESCRIPTION OF THE PREFERRED EMBODIMENTS

Figure 1:
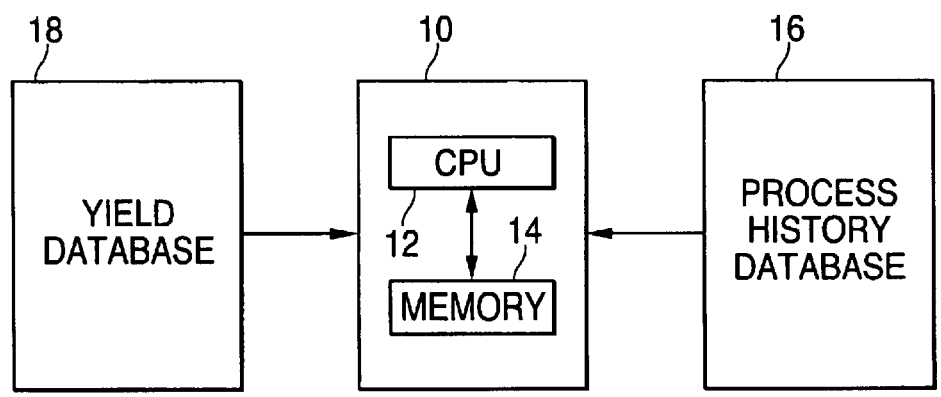
FIG. 1 is a block diagram showing the system of the present invention.

The present invention provides a method and system for determining one or more of the best process paths from literally thousands of possible paths to provide the foundation for yield control. The present invention incorporates the Taguchi method into a semiconductor manufacturing process. The method of the present invention is applicable to a plurality of lot information $D_1 \ldots D_A$, wherein A is the number of lots. In mass production of semiconductor wafers, a plurality of wafers (for example, 25 wafers) are placed in a "lot," and therefore a "lot" is used as a unit in semiconductor manufacturing.

Lot information $D_a$ corresponds to lot $L_a$, which contains N chips, $W_{a,1} \ldots W_{a,N}$, and each lot is manufactured by a specific manufacturing process that includes M operations $Op_1 \ldots Op_M$. Operation $Op_m$ is performed by one of a plurality of tools $T_{m,1} \ldots T_{m,K(m)}$, wherein K(m) represents the number of available tools in operation $Op_m$. Lot information $D_a$ includes a process path information $Ld_a$ and yield information $Yd_a$. Process path $Ld_a$ is formed by a sequential order of tools $T_{1,k(1)} \ldots T_{m,k(m)}$, wherein k(m) is an integer between 1 and K(m), to indicate a process path followed by lot $L_a$ with tool $T_{m,k(m)}$. Yield information $Yd_a$ includes N chip yields $Y_{a,1} \ldots Y_{a,N}$, that correspond to chips $W_{a,1} \ldots W_{a,N}$, respectively.

The method in accordance with the present invention calculates the statistical characteristics $Ch_1 \ldots Ch_A$ that correspond to yields $Yd_1 \ldots Yd_A$, respectively, by using the chip yields $Y_{a,1} \ldots Y_{a,N}$ as inputs. Applying the Taguchi method, with $Ch_1 \ldots Ch_A$ as plural responses, $Op_1 \ldots Op_M$ as plural control factors, and plural tools $T_{m,1} \ldots T_{m,K(m)}$ as plural factor levels that correspond to control factors $Op_m$, one or more of the tools of the most influential operation $Op_{most}$ in terms of statistical characteristics can be found by using an analysis of variance ("ANOVA") method. One or more of the best tools $T_{most, opt}$, having the most contribution to one or more of the statistical characteristics $Ch_1 \ldots Ch_A$ can be determined also, wherein "opt" is an integer between 1 and K(most). The best process path will be the one incorporating the best tool $T_{most, opt}$.

Another objective of the present invention is to provide a system for determining one or more the best process paths. The system is connected to a yield database and a process history database. The yield database stores plural yield data $Yd_1 \ldots Yd_A$, wherein A is the total number of lots, that correspond to wafer lots $L_1 \ldots L_A$, respectively, designed for a specific manufacturing process. Each wafer lot $L_a$ comprises N wafers $W_{a,1} \ldots W_{a,N}$. Each yield data $Yd_s$ comprises N chip yields $Y_{a,1} \ldots Y_{a,N}$, that correspond to the wafers $W_{a,1} \ldots W_{a,N}$, respectively. The specific process path includes M tools $T_{1,k(1)} \ldots T_{1,k(M)}$ in a sequential order and the operation $Op_m$ is performed on one of the tools $T_{1,k(1)} \ldots T_{1,k(M)}$, wherein K(m) is the number of tools that can be used by operation $Op_m$. The process history database stores a plurality of process paths $Ld_1 \ldots Ld_A$. Process path $Ld_a$ includes a sequential order of tools $T_{1,k(1)} \ldots T_{1,k(M)}$, wherein k(m) is an integer between 1 and K(m), and represents a relative manufacturing processes of the operation $Op_m$ performed with the tool $T_{m,k(m)}$.

The system of the present invention includes a memory for storing a program and a microprocessor, or a CPU, for processing the program stored in the memory. According to the program, the microprocessor performs the steps of (1) reading the yield data $Yd_1 \ldots Yd_A$ and process paths $Ld_1 \ldots Ld_A$ from the yield database and process history database, respectively; (2) with a statistical method, calculating the statistical characteristics $Ch_1 \ldots Ch_A$ that correspond to the yield data $Yd_1 \ldots Yd_A$, by using chip yield data $Y_{a,1} \ldots Y_{a,N}$ as inputs; and (3) applying the Taguchi method with $Ch_1 \ldots Ch_A$ as plural responses, $Op_1 \ldots Op_M$ as plural control factors, and plural tools $T_{m,1} \ldots T_{m,K(m)}$ factor levels that correspond to control factors to identify one or more tools that contribute the most to operation $Op_{most}$ in terms of statistical characteristics found by using an ANOVA method. The best tool $T_{most, opt}$, having the most contribution to the one or more of the statistical characteristics $Ch_1 \ldots Ch_A$, can be determined also, wherein "opt" is an integer between 1 and K(most). The best possible process path will be the one incorporating the best tool $T_{most, opt}$.

$Ch_a$ can be considered an average $YM_a$ of yields $Y_{a,1} \ldots Y_{a,N}$ or a signal to noise ratio (S/N) of the chip yield $Yd_a$ for $Y_{a_1} \ldots Y_{a,N}$. The best process path may be determined by combining the tools case where the tools having the most contribution to the signal to noise ratio and contribution to the average yield are different, the signal to noise ratio should be considered first considering the importance of stabilizing the process and increasing the yield.

An advantage of the present invention resides in that the method considers an integrated influence from all the operations, rather than the influence from one single operation. Once the best process path is determined, the reliability and yield can be maintained within a certain range if the manufacturing process is performed based on the best process path.

FIG. 1 is a block diagram showing the connection of the system of the present invention. Referring to FIG. 1, a system 10 includes a microprocessor (CPU) 12 and a memory 14. The microprocessor 12 carries out the processing steps based on the program stored in the memory 14. The system 10 connects to and received information from a process history database 16 and a yield database 18.

Figure 2:
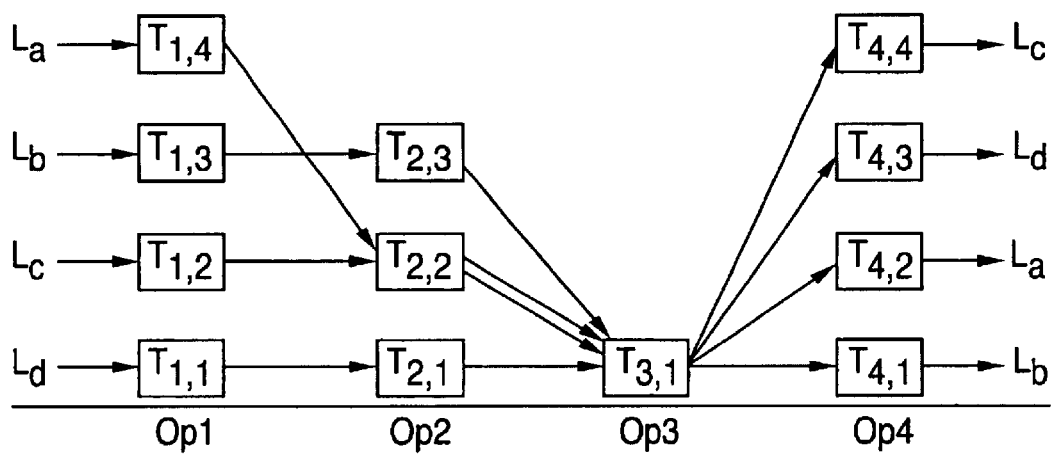
FIG. 2 shows a flow chart showing process operations of four wafer lots.

FIG. 2 shows a flow chart showing process operations of four wafer lots $L_a$, $L_b$, $L_c$, and $L_d$. The four wafer lots are processed following a specific manufacturing process. Assuming there is a manufacturing process PF101, the operations in the process PF101 comprise $Op_1$, $Op_2$, $Op_3$, $Op_4$, etc. The tools in the operation $Op_1$ comprise $T_{1,1}$, $T_{1,2}$, $T_{1,3}$ and $T_{1,4}$. Similarly, the tools in the operations $Op_2$, $Op_3$ and $Op_4$ respectively comprise $T_{2,1}$, $T_{2,2}$, $T_{2,3}$ and $T_{2,4}$, $T_{3,1}$, $T_{3,2}$, $T_{3,3}$ and $T_{3,4}$, $T_{4,3}$ and $T_{4,4}$. Referring to FIG. 2, the wafer lot $L_a$ is processed sequentially by tool $T_{1,4}$ during operation $Op_1$, $T_{2,2}$ during operation $Op_2$, $T_{3,1}$ during operation $Op_3$, and $T_{4,2}$ during operation $Op_4$. Wafer lot $L_b$ is processed sequentially by tool $T_{1,3}$ during operation $Op_1$, $T_{2,3}$ during operation $Op_2$, $T_{3,1}$ during operation $Op_3$, and $T_{4,1}$ during operation $Op_4$. Accordingly, $T_{1,4}$, $T_{2,2}$, $T_{3,1}$ and $T_{4,2}$ form a process path for lot $L_a$ and $T_{1,3}$, $T_{2,3}$, $T_{3,1}$ and $T_{4,1}$ form a process path for lot $L_b$. Therefore, from operations $Op_1$ to $Op_4$, there are a total of 4×3×1×4=48 possible process paths.

Generally, the manufacturing process in a semiconductor industry is controlled by a central control system (not shown), and the process paths are recorded in the process history database 16. After a lot of wafers have completed the manufacturing process, the wafers are sorted to determine whether the wafers function as expected, and a wafer yield is thus calculated. The wafer yields $Y_{a,1} \ldots Y_{a,N}$ of the wafer lot $L_a$ that correspond to the wafers $W_{a,1} \ldots W_{a,N}$ are stored in the yield database 18.

Figures 3, 4:
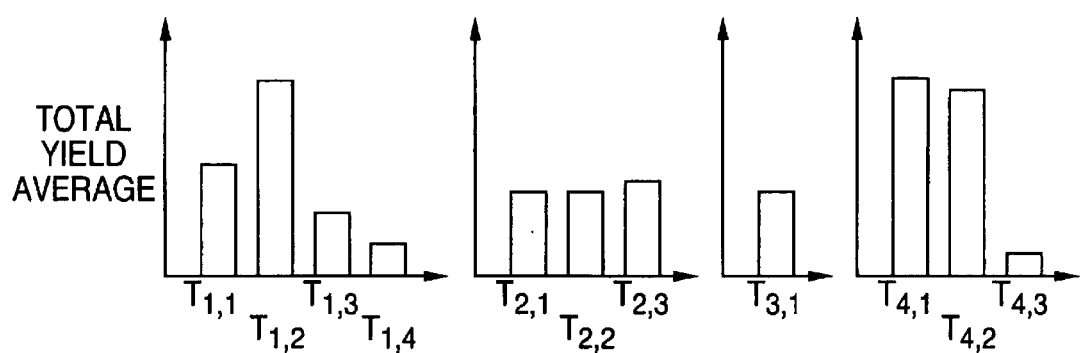
FIG. 3 shows a table of wafer lot information.
FIG. 4 shows four graphs of expected average yields of different tools.

The system 10 of the present invention is connected to the yield database 18 and process history database 16. The system 10 first fetches and analyzes the information about A wafer lots $L_1 \ldots L_A$ from the yield database 18 and the process history database 16 to generate a plurality of wafer lot information. FIG. 3 shows a table of wafer lot information. Referring to FIG. 3, the wafer lot information $Da$ includes information relative to wafer lot $L_a$ and the manufacturing process PF101 to manufacture the wafer lot $L_a$. The manufacturing process PF101 includes operations $Op_1$, $Op_2$, $Op_3$ and $Op_4$ and a process path $Ld_a$ for wafer lot $L_a$. Process path $Ld_a$ includes tools $T_{1,4}$, $T_{2,2}$, $T_{3,1}$ and $T_{4,2}$. The yield data $Yd_a$ include at least four wafer yields $Y_{a,1} \ldots Y_{a,4}$, that correspond to wafers $W_{a,1} \ldots W_{a4}$, respectively.

The microprocessor 12 calculates a statistical characteristic for each wafer lot with a statistical method. The statistical characteristic can be an average yield YM or a signal to noise ratio (S/N). Here, using the average yield YM as an example, the microprocessor calculates average yields $YM_1 \ldots YM_A$ that correspond to lots $L_1 \ldots L_A$, such that $YM_a \equiv (\Sigma Y_{a,N})/N$, wherein N is the number of the wafers in the wafer lot $L_a$.

From FIG. 3, the same process path causes the same average yield. Therefore, in accordance with the present invention, the system utilizes a Taguchi method by setting the average yields as responses, the operations in the manufacturing process as control factors, and the tools at every operation as plural factor levels in response to a corresponding operation. An ANOVA method is used to determine an operation $Op_{most}$ that most dynamically influences the average yield. The so-called operation $Op_{most}$ is the one that would cause the responses to change greater than a predetermined level when the tools are changed at this operation $Op_{most}$. Next, the system of the present invention determines one or more tools $T_{most,opt}$ at the station $Op_{most}$ that most contribute to the average yield. The ANOVA method will be described in detail hereinafter.

FIG. 4 shows four graphs of expected average yields of the tools that the wafer lots will go through for operations $Op_1 \ldots Op_4$. The height of the bars represents the total average yield for each operation. By means of a statistic calculation, a total average yield can be obtained by averaging the average yields of the wafer lots processed by tool $T_{1,1}$. The bar corresponding to the tool $T_{1,1}$ represents an expected average yield for wafer lots processed by tool $T_{1,1}$. In this manner, all of the total average yields of all wafer lots can be obtained. Referring to FIG. 4, as the tools of the operation $Op_1$ change, the total average yield changes dramatically. In contrast, a change in the tools for operation $Op_2$ does not cause a major change in the total average yield. The operations $Op_1$ and $Op_4$ will be considered, while the operation $Op_2$, which has very little influence on the average yield among different tools, and the operation $Op_3$, which only has one single tool, are generally ignored in the ANOVA method Referring to FIG. 4, a standard to which the performance of a tool is compared to identify one that contributes the most within an operation. For example, the tool $T_{1,2}$ of the operation $Op_1$ generates the largest average yield, i.e., contributes the most to the average yield within the operation, and therefore is chosen by the ANOVA method. Similarly, in operation $Op_4$, the tools $T_{4,1}$ and $T_{4,2}$ are considered having good contribution to the average yield and therefore are also chosen by the ANOVA method.

According to the above analysis, the present invention utilizes the ANOVA method to determine the most influential operations $Op_1$ and $Op_4$, then determine the tools $T_{1,2}$, $T_{4,1}$ and $T_{4,2}$ that exhibit the maximum statistical characteristic, for example, signal to noise (S/N) ratio or tools $T_{1,2}$, $T_{4,1}$ and $T_{4,2}$ provide six possible process paths (i.e., 1×3 ×1×2=6) that are deemed as the best process paths for producing the highest average yields in the manufacturing process.

In the same manner, the present invention can also be used to identify the best process paths for producing the highest signal to noise (S/N) ratio. The S/N ratio of the wafer lot $L_a$ can be calculated by: $S/N_a = 10 \log (|X_a/\sigma_a|)^2$, wherein $X_a$ and $\sigma_a$ are the average value and standard deviation of the yield $Yd_a$, respectively. In other words, the ANOVA method is carried out by setting the signal to noise ratios as responses, operations in the manufacturing process as control factors, and tools of each corresponding operation as plural factor levels.

FIG. 5 is a flow chart of the method of the present invention. The method starts at step 28. At step 30, the method reads the yield data $Yd_a$ for each wafer lot $L_a$ and the process path data $Ld_a$ thereof. At step 32, the average yield $YM_a$ for wafer lot $L_a$ and the signal to noise ratio $S/N_a$ is calculated. At step 34, with the average yield or noise ratio as responses, all operations used in the manufacturing process as control factors, and all tools in each operation as plural factor levels corresponding to a control factor, the method determines the most influential operation $Op_{most}$ that contributes the most to the average yield, and identifies one or more tools $T_{most,opt}$ that exhibit better than average contributions to the average yield. At step 36, the method outputs all process paths that include the best tool $T_{most,opt}$, i.e., all the best process paths. The method of the present invention terminates at step 38.

The best process paths determined by using the average yields as outputs may be different from those found by using the noise ratios as outputs. The engineer should choose the process paths based on which result is the most important for the individual manufacturing process. In general, process paths chosen from the signal to noise ratio method as the primary consideration and those chosen from the average yields serve to supplement the method. After one or more of the best process paths are determined, the production line can be designed to process wafer lots with the best process paths. This way, a yield is controlled within a reliable range.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples are considered as exemplary only, with a true scope and spirit of the invention being indicated by the following claims.

What is claimed is:

1. A computer-implemented method for identifying the best process path in a semiconductor manufacturing process for processing a plurality of wafer lots, comprising:

providing a plurality of operation in the semiconductor manufacturing process;

providing a plurality of tools in at least one of the plurality of operations;

providing a plurality of process paths;

providing a plurality of lot yields corresponding to the plurality of wafer lots;

setting the plurality of lot yields as responses;

setting the plurality of operations as control factors;

setting the plurality of tools as factor levels in response to at least one of the plurality of operations;

determining at least one of the plurality of operations by using an analysis of variance method with the responses, control factors, and factor levels;

determining a best tool for the one of the plurality of operations having the most influence by retrieving a maximum statistical characteristic; and outputting at least one best process path from the plurality of process paths, wherein the at least one best process path includes the best tool.

2. The method as claimed in claim 1, wherein the statistical characteristic comprises a signal to noise ratio.

3. The method as claimed in claim 1, wherein the statistical characteristic comprises an average yield.

4. The method as claimed in claim 3, further comprising determining at least one of the plurality of tools corresponding to the at least one of the plurality of operations as having the most contribution to the average yield.

5. The method as claimed in claim 3, wherein the step of determining at least one of the plurality of operations by using an analysis of variance method includes, comparing each of the plurality of operations relative to the average yield, ignoring the plurality of operations having only a single tool, and considering the plurality of operations having a greater than a predetermined level of contribution over the average yield.

6. The method as claimed in claim 1, wherein the best process path includes the tool having the most contribution.

7. A computer-readable medium storing instructions executable by a processor for identifying the best process path in a semiconductor manufacturing process for processing a plurality of wafer lots, comprising:

providing a plurality of operations in the semiconductor manufacturing process;

providing a plurality of tools in at least one of the plurality of operations;

providing a plurality of process paths;

providing a plurality of lot yields corresponding to the plurality of wafer lots;

setting the plurality of lot yields as responses;

setting the plurality of operations as control factors;

setting the plurality of tools as factor levels in response to at least one of the plurality of operations;

determining at least one of the plurality of operations by using an analysis of variance method with the responses, control factors, and factor levels;

determining a best tool for the one of the plurality of operations having the most influence by retrieving a maximum statistical characteristic; and outputting at least one best process path from the plurality of process paths, wherein the at least one best process path includes the best tool.

8. The computer-readable medium as claimed in claim 7, wherein the statistical characteristic comprises a signal to noise ratio.

9. The computer-readable medium as claimed in claim 7, wherein the statistical characteristic comprises an average yield.

10. The computer-readable medium as claimed in claim 9, further comprising determining at least one of the plurality of tools corresponding to the at least one of the plurality of operations as having the most contribution to the average yield.

11. The computer-readable medium as claimed in claim 9, wherein the step of determining at least one of the plurality of operations by using an analysis of variance method includes, comparing each of the plurality of operations relative to the average yield, ignoring the plurality of operations having only a single tool; and considering the plurality of operations having a greater than a predetermined level of contribution over the average yield.

12. A computer-implemented method for identifying the best process path in a semiconductor manufacturing process, comprising:

providing a plurality of operations in the semiconductor manufacturing process;

providing a plurality of tools in at least one of the plurality of operations;

providing a plurality of process paths;

providing a plurality of lot yields corresponding to the plurality of wafer lots;

setting the plurality of lot yields as responses;

setting the plurality of operations as control factors;

setting the plurality of tools as factor levels in response to at least one of the plurality of operations;

determining at least one of the plurality of operations by using an analysis of variance method with the responses, control factors, and factor levels;

determining a best tool for the one of the plurality of operations having the most influence by retrieving a maximum statistical characteristic; and outputting at least one best process path from the plurality of process paths, wherein the at least one best process path includes the best tool.

13. The method as claimed in claim 12, wherein the statistical characteristics is a signal to noise ratio of the plurality of wafer yields.

14. The method as claimed in claim 12, wherein the best process path of the semiconductor process includes the tool having the most contribution.

\* \* \* \* \*

UNITED STATES PATENT AND TRADEMARK OFFICE
CERTIFICATE OF CORRECTION

PATENT NO. : 6,975,916 B2 Page 1 of 1
DATED : December 13, 2005
INVENTOR(S) : Neal Kuo It is certified that error appears in the above-identified patent and that said Letters Patent is hereby corrected as shown below:

<u>Column 7,</u>
Line 59, "operation" should read -- operations --.

Signed and Sealed this

Eleventh Day of April, 2006

JON W. DUDAS
*Director of the United States Patent and Trademark Office*